Nov. 15, 1932.  J. LANG  1,887,937
CORN HARVESTER
Filed March 14, 1932   3 Sheets-Sheet 1
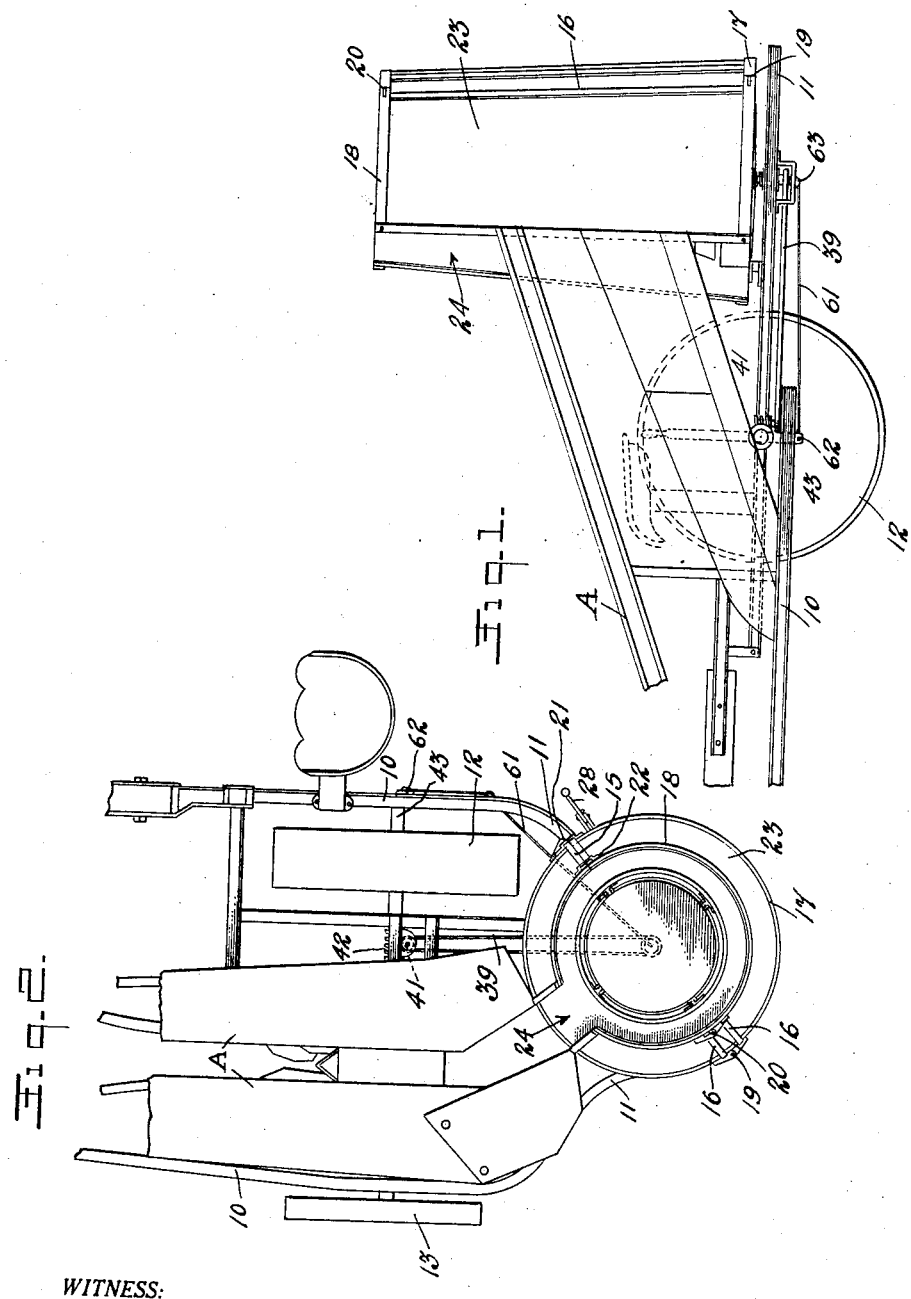
WITNESS:
O H Cook
Irma D. Brown
INVENTOR
Joseph Lang
BY Joshua R H Porss
HIS ATTORNEY Nov. 15, 1932.  J. LANG  1,887,937
CORN HARVESTER
Filed March 14, 1932  3 Sheets-Sheet 2
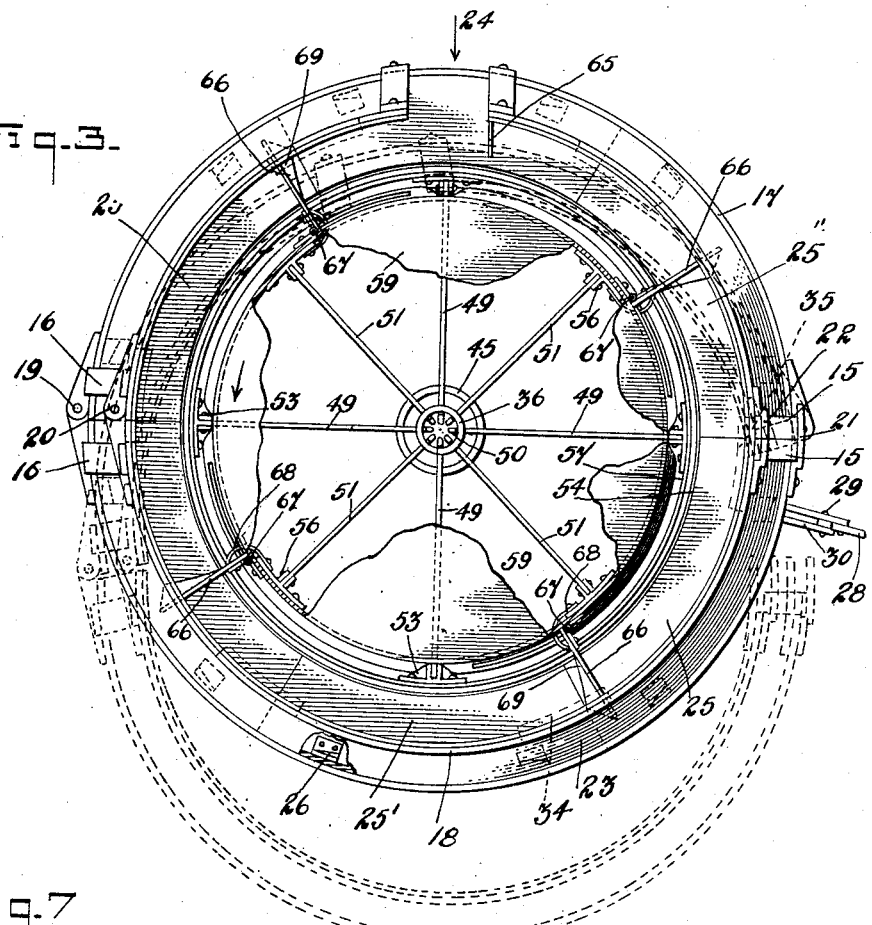
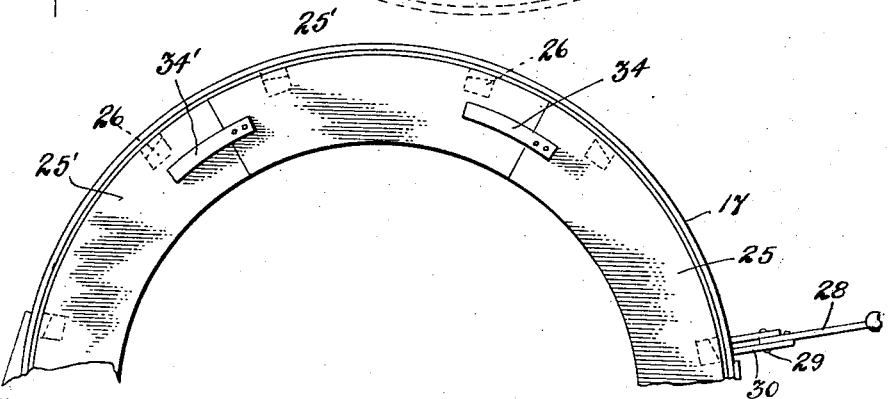
WITNESS:
INVENTOR
Joseph Lang
BY Joshua R. H. Potts
HIS ATTORNEY

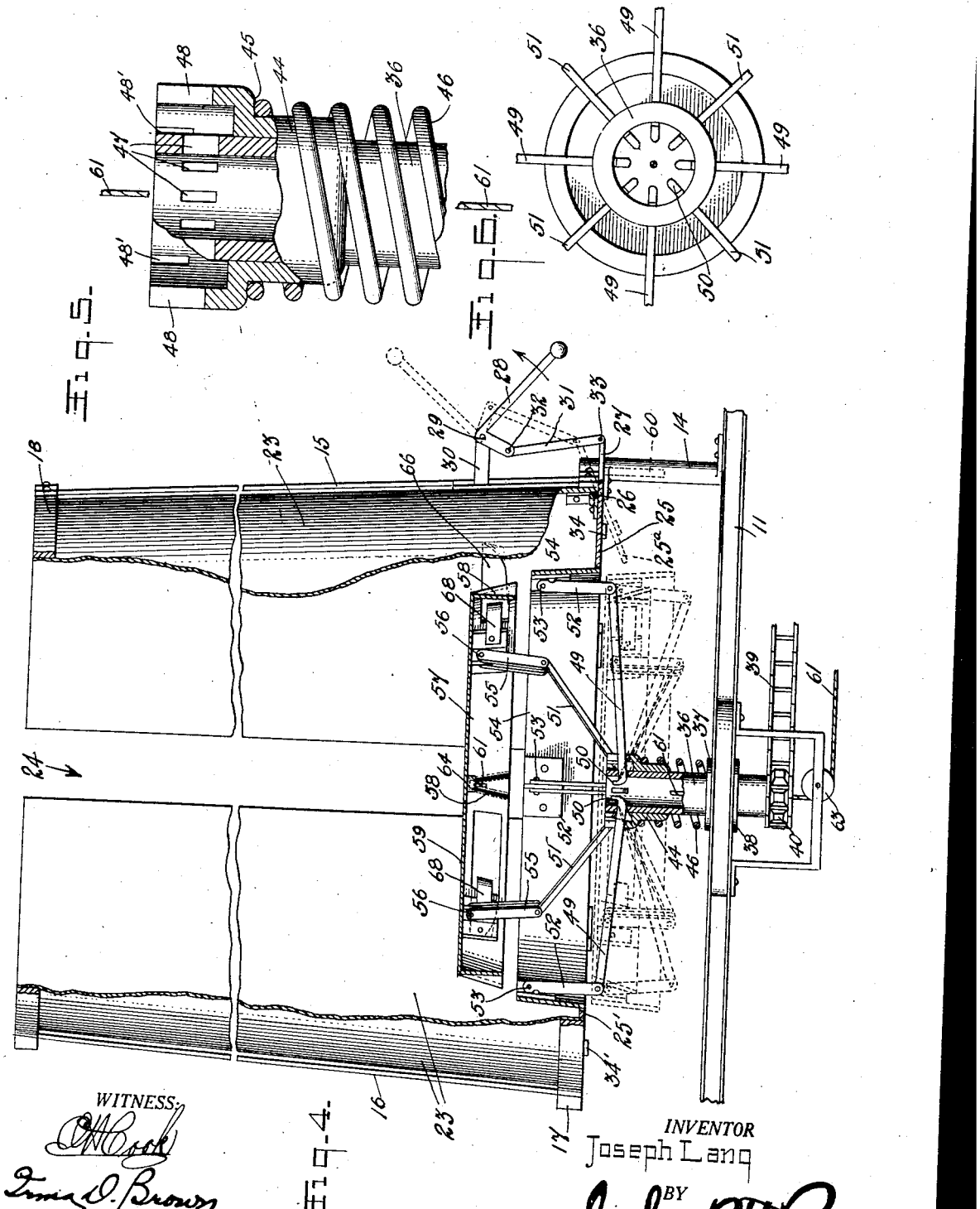

Patented Nov. 15, 1932

1,887,937

UNITED STATES PATENT OFFICE

JOSEPH LANG, OF PHILADELPHIA, PENNSYLVANIA

CORN HARVESTER

Application filed March 14, 1932. Serial No. 598,595.

This invention relates to corn harvesters, and has for an object to provide improved means for collecting the cut corn and arranging in form of shocks, with improved means for discharging the shocks.

A further object of the invention is to provide in combination with a cutting and elevating structure of a rotating part associated with a stationary part, the rotating part being arranged to carry the corn stalks about a circular pathway upon the stationary part and arrange the stalks in circular form for tying into shocks.

A further object of the invention is to provide in combination with cutting and elevating mechanism, a deck adapted to swing about a vertical axis for discharging but to remain stationary during the forming of the shock, with a centrally located rotating part for carrying the corn stalks about the stationary part, said rotating part being collapsible to permit the shock of corn being moved laterally thereover for discharge.

A further object of the invention is to provide a drum having a side open toward the elevating mechanism to receive corn stalks from such elevating mechanism, said drum having converging sides and being hinged to open for the discharge of corn shocks formed therein by the stalks received from the elevating mechanism.

A further object of the invention is to provide an improved type of mechanism which is held stationary during the forming of the shock, and to drop when the drum is open for the discharge of the shock normally standing thereon.

The invention, therefore, comprises a device which is hingedly mounted upon the frame of the corn cutting and elevating mechanism, such swinging mechanism comprising a drum having a slot in one side through which the stalks of corn from the cutting and elevating mechanism are introduced, with means within the drum for assisting the corn to move about the interior of the drum to form a compact shock, said rotating part for moving the corn being collapsible to a position below the drum supporting parts so that the drum, together with the shock of corn formed therein, may swing laterally about its pivot to a position at one side of the vehicular part so that by opening the drum, the shock of corn may be discharged therefrom at a position removed from the line of travel of the vehicle in cutting the next row of corn.

The drawings illustrate an embodiment of the invention and the views therein are as follows:

Figure 1 is a view in side elevation of the improved corn harvester,

Figure 2 is a view of the improved corn harvester in top plan,

Figure 3 is an enlarged top plan view of the shock forming drum,

Figure 4 is a view partly in side elevation and partly in section of the shock forming drum, Figure 5 is a view partly in side elevation and partly in section of the hub of the rotating organization, Figure 6 is a top plan view of the hub, and Figure 7 is an inverted plan view of the annular platform which supports the stalks.

Like characters of reference indicate corresponding parts throughout the several views.

The present invention is not concerned particularly with the cutting and elevating mechanism which is disclosed generically at A. This cutting and elevating mechanism may be of any usual and ordinary type and is only shown in the present disclosure for the purpose of locating the structure of the invention properly relative to such cutting and elevating mechanism.

The structure for carrying the cutting and elevating mechanism comprises the frame 10, of any usual and ordinary formation, an extension 11 being formed thereon for the purpose of carrying the present invention in proper relation to the cutting and elevating mechanism. The frame provides the proper journals for the wheels 12 and 13 which form the device into a vehicle, the power being taken from the wheel 12 which is the drive wheel as more particularly disclosed at Figure 2.

Upon the frame 11, an upright 14 is erected, serving as a support for the drum. The drum comprises a plurality of upright frame members 15 and 16. These uprights 15 and 16 are interconnected by a band 17 entirely about the bottom and a band 18 entirely about the top, with the exception of an opening for the introduction of corn stalks, as will be hereinafter more fully described. The bands 17 and 18, although continuous, are hinged, the former at 19 and the latter at 20 to form semi-circular sections which meet and latch together opposite the hinge, the band 17 being latched at 21 and the band 18 being latched at 22. Sheet material 23 forms a drum continuously about, except for the space 24 which registers with the conduit of the elevating mechanism as shown more particularly at Figure 2 and through which the corn stalks from the elevating mechanism are introduced within the drum formed as above described.

The drum carries an annular platform composed of a plurality of sections 25, 25' and 25". These sections are hinged to the outer band 17 as at 26 so that all may drop simultaneously as indicated at 25a in Figure 4, that however, being only an initial position of movement, the sections being adapted to swing to substantially a vertical. The section 25 is provided with an arm 27 which extends radially outwardly beyond the band 17 and a bell crank lever 28 is fulcrumed at 29 upon an arm 30 rigidly secured to one of the frame members 15.

A link 31 connects one leg of the bell crank lever 28 with the arm 27 so that the fulcrum 32 may pass the dead center, represented by the fulcrum 29 and the pivot 33 connecting the link with the arm 27 so that in the position shown in full lines at Figure 4, the section 25 of the platform is locked in horizontal position, but as the lever 28 moves in the direction indicated by the arrow to dotted line position or beyond, the section 25 is dropped to the position 25a and beyond. The section 25 carries rigidly secured to the underside thereof, a lug 34 which engages under the proximate section 25' and at the opposite end carries a similar lug 35 which engages under the proximate end of the section 25". Each of the sections 25' carry a similar lug 34' which engages under the proximate section so that as the section 25 is raised by the manipulation of the lever 28, the lugs of each section, engaging under the lugs of the proximate sections, will raise all of the sections to horizontal position and will be thereby maintained in such position so that such lever 28 is in locked arrangement as shown.

Erected also upon the frame 11 is a hub 36, journaled by means of collars 37 and 38 (see Figure 4) and driven by means of a sprocket chain 39 over a sprocket 40 mounted upon said hub. The sprocket chain 39 runs to a sprocket carried upon a shaft 41 which has a worm engaging the worm gear 42 upon the axle 43 of the vehicle so that as the vehicle progresses, the hub 36 is rotated.

The hub 36 has a sleeve 44 slidably mounted thereon, with an enlarged part forming a shoulder 45 with a spring 46 embracing the hub 36 and sleeve 44 and engaging under the shoulder 45.

The hub 36 is provided adjacent its upper end with a plurality of perforations 47 and the sleeve 44 in its enlargement is provided with a plurality of slots 48 and 48', the former being deeper than the latter. A plurality of arms 49 lie in the slots 48 and are provided at their inner ends with hooks 50, hooking through some of the perforations 47. These arms 49 extend normally approximately horizontal as shown at Figure 4.

Extending through the slots 48' are other arms 51. These arms 51, as will be seen from Figure 4, extend normally at a greater inclination from the horizontal than the arms 49. The arms 50 are provided at their extremities with links 52 pivoted thereto, with the opposite ends of the links pivoted at 53 to the interior of the hoop 54. This hoop 54, as will be noted, has slightly converging sides and its maximum diameter is such as to fit within the annulus provided by the supporting sections 25, 25' and 25".

The arms 51 are similarly provided with links 55 which are similarly pivoted at 56 to a second hoop 57 smaller than the hoop 54 and adapted to close downwardly into the former hoop 54 as will be hereinafter more fully explained, the hoop 57 being provided with inwardly curved recesses 58 which pass over the pivots 53 and link 52 of the hoop 54.

The hoop 57 is also provided with a flooring 59 shown broken away at Figure 3. By the depression of the hoop 57 against the tension of the spring 46, both hoops 57 and 54 may be depressed below the level of the annular platform made up of the sections 25, so that the drum and the annular platform may swing upon the pivot 60, carrying therewith the shock of corn resting upon the annular platform.

For the purpose of depressing the hoops 57 and 54, a cable 61 passes from a hand lever 62 about a pulley 63 directly beneath the hub 36 so that the cable passes upwardly through the center of the hub and is connected with a swivel 64 under the flooring 59. At Figure 4, this cable is shown broken away for the purpose of disclosing the mechanism which would otherwise be hidden thereby.

The drum is provided with a stop 65 located adjacent the slot 24 and the hoops 54 and 57 rotate in the direction indicated by the arrows at Figures 2 and 3. The hoop 54 is provided with a plurality of arms 66 hinged thereto at 67 and extending outwardly adjacent to the interior of the drum. These arms 66 are maintained yieldingly in substantial radial position in any approved manner as by the springs 68, such springs allowing the arms 66 to yield.

The arms are also provided with inclined cam shaped lower edges, indicated at 69 so that when the hoop 57 telescopes within the hoop 54, these cam edges engaging the hoop 54, move the arms 66 upon their pivots so that they will slide downwardly within the hoop 54 with the hoop 57.

In operation, corn elevated by the cutting and elevating mechanism is introduced by any usual or preferred type of structure through the opening 24 of the drum. The botton or cut ends of the stalks, will rest upon the annular platform represented by the sections 25, 25' and 25" and will be carried by the rotating structure about the drum. This rotating structure is, of course, the hoops 54 and 57 and the radially extending arms 66. The stalks are carried by the drum until they engage against the stops 65, whereupon the arms 66 yield and pass by the stalks, leaving them in such position bringing additional stalks against the stalks already so positioned until the drum is filled properly and to the required extent with the corn stalks, the tops extending, of course, above the top of the drum, made thereby available for tying. With the shocks so formed then about the hoops 54 and 57, said hoops with their associated structures are depressed by the actuation of the lever 62 and the drum and the corn contained therein is swung about the pivot 60 to a position laterally of the vehicle.

This position being attained, the lever 28 is manipulated by moving toward the dotted line position at Figure 4 whereupon, the weight of the corn bearing upon the annular platform sections will swing the platform sections substantially to a vertical and the shock of corn formed and resting thereon will drop to the ground. The drum is now unlatched by the manipulation of the latches at 21 and 22 and is opened upon the hinges 19 and 20 as indicated in dotted lines at Figure 3. The drum is thereby removed from about the shock of corn and is again swung back to receiving position and latched, and the rotating mechanism released to be raised by the spring 46 to initial position, whereupon the forming of a new shock is begun.

Of course, the corn harvester, herein illustrated, may be modified and changed in various ways without departing from the invention herein set forth and hereinafter claimed.

The invention is hereby claimed as follows:

1. A corn harvester comprising in combination a cutting and elevating mechanism, a drum positioned to receive cut stalks from the elevating mechanism, a rotating device within the drum adapted to carry the stalks about the drum, a stop for limiting the orbital movement of the stalks, means facilitating the swinging of the drum to a lateral position, means to drop the shock of corn formed within the drum, and means to open the drum to release the dropped shock.

2. A corn harvester comprising in combination a cutting and elevating mechanism, a drum mounted to swing on a vertical axis and provided with a slot registering with the elevating mechanism, an annular platform mounted within the drum and formed in hinged sections, a rotor journaled within the annulus and adapted to be depressed below such annulus, means carried by the rotor for moving corn stalks within the drum, a stop to limit the movement of the stalks, means to depress the rotor below the position of the annular platform, means to release the sections of the platform to provide for dropping the shock of corn supported thereon, and means facilitating the opening of the drum to release the drum from its embracing of the shock.

3. A corn harvester comprising in combination a cutting and elevating mechanism, a drum having a slot positioned to receive corn stalks from the elevating mechanism, an annular platform formed within the drum of segmental hinged sections, a rotor mounted within the annulus comprising telescoping hoops, yielding arms extending radially from one of said hoops adapted to carry corn stalks about the interior of the drum, a stop for limiting the movement of the corn stalks, manual means for depressing the rotor by telescoping the sections, means to swing the drum laterally of its normal position, means facilitating the dropping of the segments of the annular platform, and means facilitating the opening of the drum for releasing the contained shock.

4. A corn harvester comprising in combination a vehicle, cutting and elevating mechanism mounted upon the vehicle, a drum mounted upon the vehicle and provided with a slot registering with the elevating mechanism, an annular platform formed about the lower limit of the drum and composed of segmental hinged sections, a hub journaled concentrically of the annular platform, arms extending radially from the hub and at different inclinations, hoops carried at the outer ends of the arms and adapted to telescope one within the other and both be depressed below the annular platform, manual means to provide such telescoping and depressing action, means facilitating the swinging of the drum laterally of the vehicle, means releasing the support of the segmental platform sections to drop the shock, and means facilitating the opening of the drum to release the shock contained therein.

In testimony whereof I have signed my name to this specification.

JOSEPH LANG.